(12) United States Patent
Michiels et al.

(10) Patent No.: US 9,838,198 B2
(45) Date of Patent: Dec. 5, 2017

(54) SPLITTING S-BOXES IN A WHITE-BOX IMPLEMENTATION TO RESIST ATTACKS

(71) Applicant: NXP B.V., Eindhoven (NL)

(72) Inventors: Wil Michiels, Reusel (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 545 days.

(21) Appl. No.: 14/219,734

(22) Filed: Mar. 19, 2014

(65) Prior Publication Data

US 2015/0270950 A1 Sep. 24, 2015

(51) Int. Cl.
| | | |
|---|---|---|
| H04L 9/28 | (2006.01) | |
| H04L 9/00 | (2006.01) | |
| H04L 29/06 | (2006.01) | |
| G09C 1/00 | (2006.01) | |
| H04L 9/06 | (2006.01) | |

(52) U.S. Cl.
CPC .......... *H04L 9/002* (2013.01); *G09C 1/00* (2013.01); *H04L 63/1466* (2013.01); *H04L 9/0618* (2013.01); *H04L 2209/043* (2013.01); *H04L 2209/16* (2013.01); *H04L 2209/24* (2013.01)

(58) Field of Classification Search
None
See application file for complete search history.

(56) References Cited

U.S. PATENT DOCUMENTS

| | | | |
|---|---|---|---|
| 8,095,993 B2* | 1/2012 | Shu | G06F 9/3001 380/28 |
| 9,455,833 B2 | 9/2016 | Michiels et al. | |
| 2003/0086564 A1* | 5/2003 | Kuhlman | H04L 9/0618 380/37 |
| 2003/0223580 A1* | 12/2003 | Snell | H04L 9/003 380/28 |
| 2004/0139340 A1* | 7/2004 | Johnson | G06F 21/14 713/194 |

(Continued)

FOREIGN PATENT DOCUMENTS

| | | | | |
|---|---|---|---|---|
| CA | EP 2363974 A1 * | 9/2011 | | H04L 9/003 |
| CN | 101536398 A | 9/2009 | | |

(Continued)

OTHER PUBLICATIONS

Klinec, Dusan; "White-box attack resistant cryptography"; Masaryk Univeristy, Faculty of Informatics; retrieved from the internet: https://is.muni/.cz/th/325219/fi_m/thesis.pdf, retrieved on Aug. 19, 2015; 66 pages (Jun. 24, 2013).

(Continued)

*Primary Examiner* — Brandon Hoffman

(57) ABSTRACT

A method of performing a keyed cryptographic operation mapping an input message to an output message, wherein the input message comprises m input data and the output message comprises m output data and wherein the cryptographic operation includes at least one round and the cryptographic operation specifies a substitution box for mapping input data into output data, including: transforming each of the m input data into n output data using n split substitution boxes, wherein the n split substitution boxes sum to the specified substitution box; and mixing and combining the m×n output data.

30 Claims, 3 Drawing Sheets

(56) References Cited

U.S. PATENT DOCUMENTS

| | | | |
|---|---|---|---|
| 2007/0014394 A1 | 1/2007 | Harder et al. | |
| 2012/0008767 A1* | 1/2012 | Smith | H04L 9/0631 |
| | | | 380/28 |
| 2013/0259226 A1* | 10/2013 | Ciet | G06F 21/14 |
| | | | 380/44 |

FOREIGN PATENT DOCUMENTS

| | | |
|---|---|---|
| CN | 102461058 A | 5/2012 |
| CN | 102484581 A | 5/2012 |
| EP | 2 363 974 A1 | 9/2011 |

OTHER PUBLICATIONS

Extended European Search report for application No. 15158461.2 (Aug. 28, 2015).
Billet, Olivier et al., "Cryptanalysis of a White Box AES Implementation", Selected Areas in Cryptography, vol. 3357 of Lecture Notes in Computer Science,, Springer, 2005, 227-240.
Chow, Stanley et al., "A White-Box DES Implementation for DRM Applications", Digital Rights Management: ACM CCS-9 Workshop, DRM 2002, Washington, D.C., USA, Nov. 18, 2002, 1-16.
Chow, Stanley et al., "White-Box Cryptography and an AES Implementation", Cryptography: 9th Annual International Workshop, SAC 2002, St. John's, Newfoundland, Canada, Aug. 15, 2002.

* cited by examiner

WHITE-BOX IMPLEMENTATION

FUNCTIONS $f_i, g_i$ FIXED

SPLITTING S-BOXES IN A WHITE-BOX IMPLEMENTATION TO RESIST ATTACKS

TECHNICAL FIELD

Various exemplary embodiments disclosed herein relate generally to securing white-box cryptographic components against attacks.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has lead to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software instructions, monitoring memory during operation, specifically when the cryptographic functions are operating, or using debuggers.

The widespread use of DRM and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of performing a keyed cryptographic operation mapping an input message to an output message, wherein the input message comprises m input data and the output message comprises m output data and wherein the cryptographic operation includes at least one round and the cryptographic operation specifies a substitution box for mapping input data into output data, including: transforming each of the m input data into n output data using n split substitution boxes, wherein the n split substitution boxes sum to the specified substitution box; and mixing and combining the m×n output data.

Various embodiments are described further including m sets of n split substitution boxes, wherein all of the sets of n split substitution boxes applied to each of the plurality of input data are different from one another and the n split substitution boxes sum to the specified substitution box.

Various embodiments are described further including m sets of n split substitution boxes, wherein at least two of the sets of n split substitution boxes applied to each of the plurality of input data are different from one another and the n split substitution boxes sum to the specified substitution box.

Various embodiments are described wherein mixing and combining the m×n output data includes at least one of the n outputs of each of the m sets of outputs is combined with at least one output of another set n outputs before the at least one of the n outputs is combined with the remaining n−1 outputs of its set of outputs.

Various embodiments are described wherein the input data is unencoded data input into a first round of the keyed cryptographic operation.

Various embodiments are described wherein the combined output data is used to calculate a portion of the output message, wherein the output message is an unencoded output of the last round of the keyed cryptographic operation.

Various embodiments are described wherein the cryptographic operation is the Advanced Encryption Standard.

Various embodiments are described wherein the cryptographic operation is the Data Encryption Standard.

Various embodiments are described wherein transforming an input data into n output data using n split substitution boxes is implemented using a n lookup tables corresponding to the n split substitution boxes, wherein the n lookup tables combine the n split substitution boxes with a cryptographic key.

Various embodiments are described wherein n output data are encoded and the encoding is implemented in the n lookup tables.

Various embodiments are described wherein transforming an input data into n output data using n split substitution boxes is implemented using a n finite state machines corresponding to the n split substitution boxes, wherein the n finite state machines combine the n split substitution boxes with a cryptographic key.

Further, various exemplary embodiments relate to a method of performing an Advance Encryption Standard (AES) cryptographic operation, including: receiving four unencoded input column bytes of the AES state by a first round of the AES cryptographic operation; inputting a first unencoded input column byte into n first lookup tables to obtain n first output values, wherein each of the n first lookup tables combines one of n first split S-boxes, a first cryptographic key, and a MixColumn constant, and wherein the n first split S-boxes sum to the AES S-box; inputting a second unencoded input column byte into n second lookup tables to obtain n second output values, wherein each of the n second lookup tables combines one of n second split S-boxes, a second cryptographic key, and a MixColumn constant, and wherein the n second split S-boxes sum to the AES S-box; inputting a third unencoded input column byte into n third lookup tables to obtain n third output values, wherein each of the n third lookup tables combines one of n third split S-boxes, a third cryptographic key, and a MixColumn constant, and wherein the n third split S-boxes sum to the AES S-box; inputting a fourth unencoded input column byte into n fourth lookup tables to obtain n fourth output values, wherein each of the n fourth lookup tables combines one of n fourth split S-boxes, a fourth cryptographic key, and a MixColumn constant, and wherein the n fourth split S-boxes sum to the AES S-box; mixing and combining the n encoded first, second, third, and fourth output values into an encoded output byte of the output AES state of the first round of the AES cryptographic operation.

Various embodiments are described further including receiving four encoded input column bytes of an input state to the last round of the AES cryptographic operation; inputting a first encoded input column byte into m first lookup tables to obtain m first output values, wherein each of the m first lookup tables combines one of m second split S-boxes, a first cryptographic key, and a MixColumn constant, and wherein the m second split S-boxes sum to the AES S-box; inputting a second encoded input column byte into m second lookup tables to obtain m second output values, wherein each of the m second lookup tables combines one of m second split S-boxes, a second cryptographic key, and a MixColumn constant; inputting a third encoded input column byte into m third lookup tables to obtain m third output values, wherein each of the m third lookup tables combines one of m second split S-boxes, a third cryptographic key, and a MixColumn constant; inputting a fourth encoded input column byte into m fourth lookup tables to obtain m fourth output values, wherein each of the m fourth lookup tables combines one of m second split S-boxes, a fourth cryptographic key, and a MixColumn constant; combining the m encoded first, second, third, and fourth output values into an unencoded output byte of the output state of the last round of the AES cryptographic operation.

Various embodiments are described wherein the cryptographic operation includes a first round and a second round, the input message comprises m input data and the output message comprises m output data, and the cryptographic operation specifies a substitution box for mapping input data into output data, further including: transforming each of the m unencoded first round input data into n encoded first round output data using n first split substitution boxes, wherein the n first substitution boxes sum to the specified substitution box; mixing and combining the m×n encoded first round output data.

Various embodiments are described further including: transforming each of the m encoded last round input data into m encoded last round output data using i second split substitution boxes, wherein the i first substitution boxes sum to the specified substitution box; and mixing and combining the m×i encoded last round output data into an unencoded last round output data.

Various embodiments are described wherein the cryptographic operation is the Advanced Encryption Standard.

Various embodiments are described wherein the cryptographic operation is the Data Encryption Standard.

Various embodiments are described wherein transforming an input data into n output data using n first split substitution boxes is implemented using a n lookup tables corresponding to the n first split substitution boxes, wherein the n lookup tables combine the n split substitution boxes with a cryptographic key.

Various embodiments are described wherein n output data are encoded and the encoding is implemented in the n first lookup tables.

Various embodiments are described wherein transforming an input data into n output data using n first split substitution boxes is implemented using a n finite state machines corresponding to the n first split substitution boxes, wherein the n finite state machines combine the n split substitution boxes with a cryptographic key.

Further, various exemplary embodiments relate to a non-transitory machine-readable storage medium encoded with instructions for execution by a white-box system, wherein the white-box system performs a keyed cryptographic operation mapping an input message to an output message, wherein the input message comprises m input data and the output message comprises m output data and wherein the cryptographic operation includes at least one round and the cryptographic operation specifies a substitution box for mapping input data into output data, the non-transitory machine-readable storage medium comprising, including: instructions for transforming each of the m input data into n output data using n split substitution boxes, wherein the n split substitution boxes sum to the specified substitution box; and instructions for mixing and combining the m×n output data.

Various embodiments are described further including m sets of n split substitution boxes, wherein all of the sets of n split substitution boxes applied to each of the plurality of input data are different from one another and the n split substitution boxes sum to the specified substitution box.

Various embodiments are described further including m sets of n split substitution boxes, wherein at least two of the sets of n split substitution boxes applied to each of the plurality of input data are different from one another and the n split substitution boxes sum to the specified substitution box.

Various embodiments are described wherein instructions for mixing and combining the m×n output data includes at least one of the n outputs of each of the m sets of outputs is combined with at least one output of another set n outputs before the at least one of the n outputs is combined with the remaining n−1 outputs of its set of outputs.

Various embodiments are described wherein the input data is unencoded data input into a first round of the keyed cryptographic operation.

Various embodiments are described wherein the combined output data is used to calculate a portion of the output message, wherein the output message is an unencoded output of the last round of the keyed cryptographic operation.

Various embodiments are described wherein the cryptographic operation is the Advanced Encryption Standard.

Various embodiments are described wherein the cryptographic operation is the Data Encryption Standard.

Various embodiments are described wherein instructions for transforming an input data into n output data using n split substitution boxes is implemented using a n lookup tables corresponding to the n split substitution boxes, wherein the n lookup tables combine the n split substitution boxes with a cryptographic key.

Various embodiments are described wherein n output data are encoded and the encoding is implemented in the n lookup tables.

Various embodiments are described wherein instructions for transforming an input data into n output data using n split substitution boxes is implemented using a n finite state machines corresponding to the n split substitution boxes, wherein the n finite state machines combine the n split substitution boxes with a cryptographic key.

Further, various exemplary embodiments relate to a method of producing a white-box implementation of a cryptographic operation mapping an input message to an output message in a white-box system, wherein the input message comprises m input data and the output message comprises m output data and wherein the cryptographic operation includes at least one round and the cryptographic operation specifies a substitution box for mapping input data into output data, including: producing a white-box implementation of the keyed cryptographic operation further including: producing n split substitution boxes, wherein the n split substitution boxes sum to the specified substitution box; and implementing the mixing and the combining of the m×n output data in the white-box system.

Various embodiments are described wherein the split substitution boxes further comprises m sets of n split substitution boxes, wherein all of the sets of n split substitution boxes applied to each of the plurality of input data are different from one another and the n split substitution boxes sum to the specified substitution box.

Various embodiments are described wherein the split substitution boxes further comprises m sets of n split substitution boxes, wherein at least two of the sets of n split substitution boxes applied to each of the plurality of input data are different from one another and the n split substitution boxes sum to the specified substitution box.

Various embodiments are described wherein mixing and combining the m×n output data includes at least one of the n outputs of each of the m sets of outputs is combined with at least one output of another set n outputs before the at least one of the n outputs is combined with the remaining n−1 outputs of its set of outputs.

Various embodiments are described wherein the input data is unencoded data input into a first round of the keyed cryptographic operation.

Various embodiments are described wherein the combined output data is used to calculate a portion of the output message, wherein the output message is an unencoded output of the last round of the keyed cryptographic operation.

Various embodiments are described wherein the cryptographic operation is the Advanced Encryption Standard.

Various embodiments are described wherein the cryptographic operation is the Data Encryption Standard.

Various embodiments are described wherein the n split substitution boxes are implemented using n lookup tables corresponding to the n split substitution boxes, wherein the n lookup tables combine the n split substitution boxes with a cryptographic key.

Various embodiments are described wherein n output data are encoded and the encoding is implemented in the n lookup tables.

Various embodiments are described wherein the n split substitution boxes are implemented using n finite state machines corresponding to the n split substitution boxes, wherein the n finite state machines combine the n split substitution boxes with a cryptographic key.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
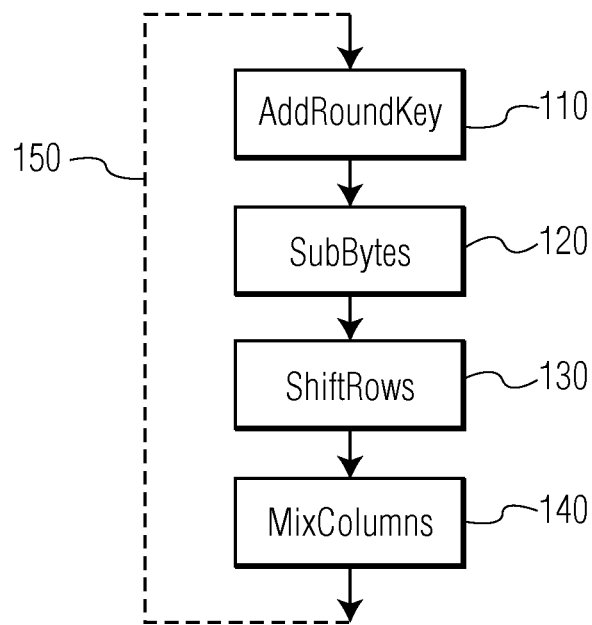
FIG. 1 illustrates the main steps of a round of AES.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well. The lookup tables and finite state machines that are described may be implemented in hardware to carry out the various functions described.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

Chow describes implementing a cryptographic algorithm as a network of lookup tables. Next, this network of lookup tables is obfuscated by encoding their input and output, i.e., by encoding the intermediate values in the implementation. Chow 1 and Chow 2 observed that in a white-box implementation of AES and DES, the implementation of the first and last round is particularly challenging. The reason is that, in order to be AES and DES compatible, input encoding is not applied in the first round, and output encoding is not applied in the last round, while all other rounds have encoded input as well as encoded outputs. Chow 1 and Chow 2 avoided this problem by using external encodings.

This means that the input of the algorithm is encoded by an external encodings f that is put on the input elsewhere in the surrounding computer program. Analogously, the output of the algorithm is encoded by an external encoding g that is removed elsewhere in the surrounding program. Hence, instead of implementing a cryptographic functionality F (such as AES), $g \circ F \circ f^{-1}$ is implemented instead. This approach has two important disadvantages. In the first place, a question is how to hide the input encoding and output decoding in the surrounding program. After all, it typically happens just before and after the invocation of the white-box implementation of the cryptographic function. Secondly, it cannot be applied if the white-box implementation does not have a strong connection to the surrounding program, when, for example, the input is received from a network or medium and/or the output is sent over the network or stored on a medium.

For example, suppose that an AES S-box in a white-box implementation is only encoded by nibble-encodings. For a table-based white-box implementation, this means that it is hidden in a lookup table $T=(G_1\|G_2)\circ S \circ \oplus_k \circ (F_1^{-1}\|F_2^{-1})$, where $G_i$ and $F_i$ are nibble encodings and $\oplus_k$: $x \mapsto x \oplus k$ denotes key addition. Then, Chow 1 shows that $(G_1\|G_2)$ and $\oplus_k \circ (F_1^{-1}\|F_2^{-1})$ can be derived using so-called frequency signatures. Informally, they exploit the information that leaks by the strict separation of the two input nibbles and the two output nibbles. To see that this leaks information, observe that if the first input nibble of T, is altered then it is known that this corresponds to a modification in the first input nibble to the underlying S.

Embodiments of the invention below describe a new white-box technique which may be used to strengthen the first round of a white-box implementation that does not have an external input encoding. This technique may also be applied to the last round to provide some additional security.

The secure software may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with embodiments of this invention.

Below exemplary embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depend on the key size. Each round includes similar processing steps operating on bytes, rows, or columns of the state matrix, each round using a different round key in these processing steps.

FIG. 1 illustrates some main processing steps of a round of AES. The processing steps include:

AddRoundKey 110—each byte of the state is XORed with a byte of the round key;

SubBytes 120—a byte-to-byte permutation using a lookup table;

ShiftRows 140—each row of the state is rotated a fixed number of bytes; and

MixColumns 150—each column is processed using a modulo multiplication in $GF(2^8)$.

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and Mix-Columns 150 steps may be implemented using table look-ups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
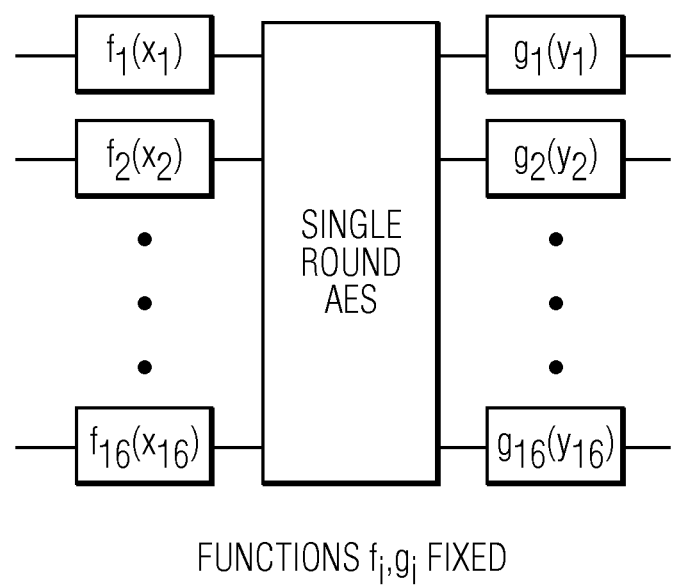
FIG. 2 illustrates a white-box AES implementation with fixed encodings on the input of the rounds.

FIG. 2 illustrates a white-box AES implementation with fixed encodings on the input of the rounds, i.e., on the input of the S-boxes. As shown, each of the 16 input bytes are encoded by $f_i$ and each of the output bytes are encoded by $g_i$. As noted above, in a standard implementation of AES, the input is not encoded and the output is not encoded.

As indicated, the white-box implementation illustrated in FIG. 2 may be broken using a frequency signature attack that determines the frequency of nibbles in the rows and columns of an obfuscated S-box. This problem may be solved by splitting the S-box into two more S-boxes in a way unknown to an attacker such that the sum of the split S-boxes is the original S-box.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function $T_{i,j}$ for input byte $x_{i,j}$ as $T_{i,j}(x_{i,j})=S(x_{i,j} \oplus k_{i,j})$ where $k_{i,j}$ is a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte $z_{i,j}$ of the round is computed from the 4 output bytes $y_{1,j}, y_{2,j}, y_{3,j}$, and $y_{4,j}$ via the algebraic expression $z_{l,j}=MC_{l,1} \cdot y_{1,j} \oplus MC_{l,2} \cdot y_{2,j} \oplus MC_{l,3} \cdot y_{3,j} \oplus MC_{l,4} \cdot y_{4,j}$ in $GF(2^8)$ for some constants $MC_{l,r}$.

Now define a lookup table for each byte-to-byte function $Q_{i,j,l}(x_{i,j})=MC_{l,i} \cdot T_{i,j}(x_{i,j})$ with $i, j, l=1, 2, \ldots, 16$. Then any output byte $z_{l,j}$ may be computed by XORing the results of these lookup tables, i.e., $z_{l,j}=Q_{1,j,l}(x_{1,j}) \oplus Q_{2,j,l}(x_{2,j}) \oplus Q_{3,j,l}(x_{3,j}) \oplus Q_{4,j,l}(X_{4,j})$. Note that the index i, j, l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the XOR tables that operate on the output of the Q-box are reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
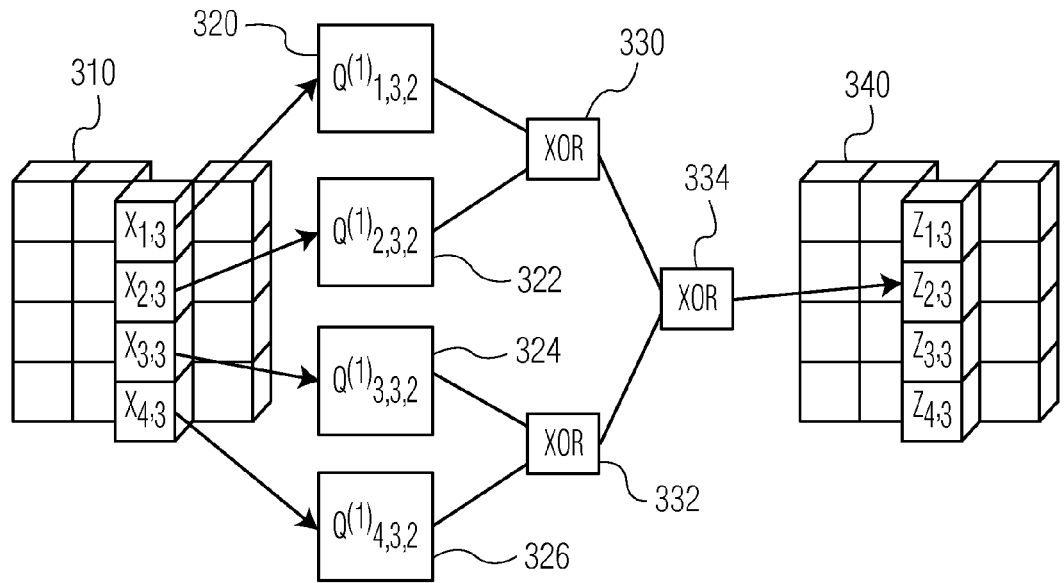
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}, x_{2,3}, x_{3,3}$, and $x_{4,3}$ in the input state 310 are input into the Q-boxes 320, 322, 324, 326. The outputs of lookup tables 320 and 322 are fed into the XOR 330, and the outputs of lookup tables 324 and 326 are fed into the XOR 332. The outputs of XORs 330 and 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
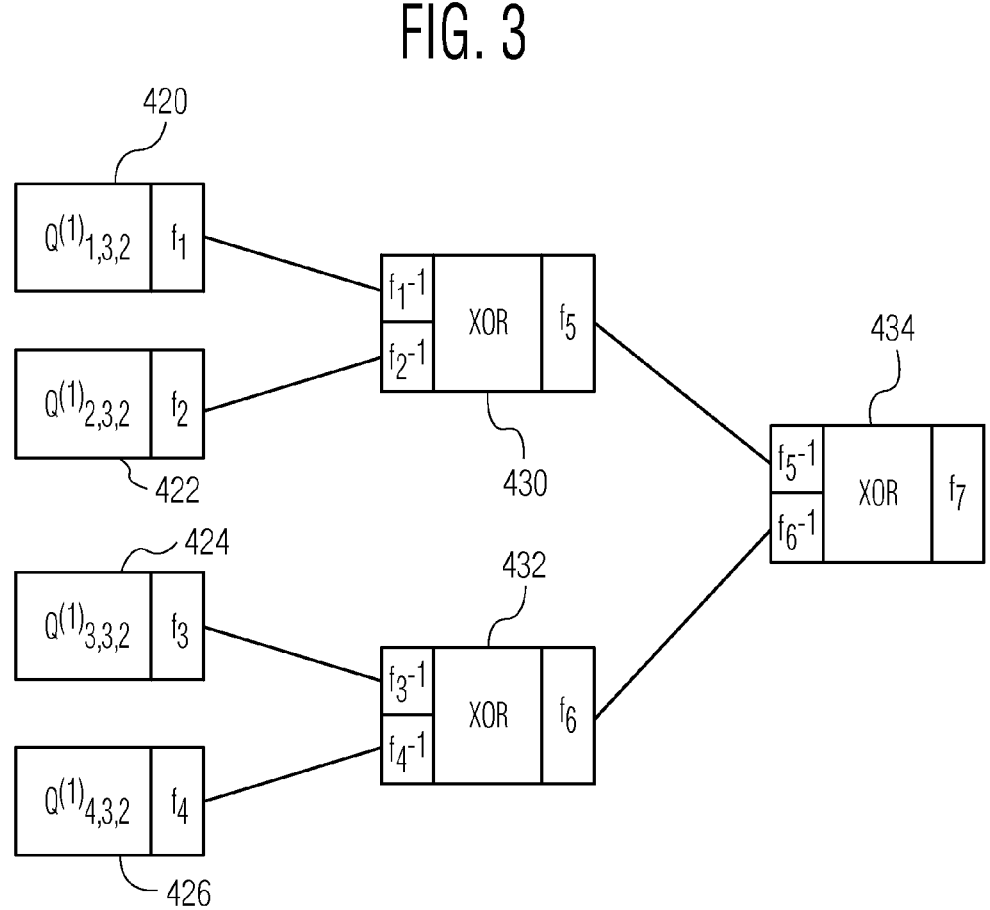
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may not include an output encoding if the output is to be AES compliant. Note that in the white-box implementation obtained, both the lookup tables and the intermediate values are obfuscated.

As described above, an S-box may be merged with a key-addition operation and the result obfuscated by encoding its input and output. For a table-based white-box AES implementation, this means that lookup tables $T= G \circ S \circ \oplus_k \circ F^{-1}$ are created for each round. For the first round F is the identity function when the interface is to be compatible with standard AES. Likewise, in the last round, G is the identity function when the interface is to be compatible with standard AES.

In order to overcome this problem where an attacker may use the frequency signature attack, the S-box may be split into r S-boxes $S_1, S_2, \ldots, S_r$ with $r \geq 2$ and create r tables that hide the split S-boxes $S_1, S_2, \ldots, S_r$. The (not-necessarily bijective) split S-box functions $S_i$ are chosen arbitrarily such that:

$$S(x)=\oplus_{i=1}^{r} S_i(x).$$

These split S-box functions $S_1, S_2, \ldots, S_r$ are then hidden in r lookup tables $T_1, T_2, \ldots, T_r$ with $$T_i=G_i \circ S_i \circ \oplus_k \circ F^{-1}.$$

The split S-box functions are particularly useful for round 1, where $F_i$ is the identity function. Further the split S-box function may provide some benefit in the last round where $G_i$ is the identity function. Note that, all tables $T_i$ have the same input byte. The $Q_i$ tables may then be calculated from the $T_i$ tables by incorporating the MixColumn constants MC as described above.

FIG. 3 shows a table network for computing the first nibble of value $z_{2,3}$ from the values $x_{1,3}, x_{2,3}, x_{3,3}, x_{4,3}$. A table network for computing the first nibble of value $z_{2,3}$ from values $x_{1,3}, x_{2,3}, x_{3,3}, x_{4,3}$ according to an embodiment of the invention for r=2 will now be described. It is noted that other values of $r \geq 2$ may be used as well. A white-box implementation according to this embodiment may obtained by obfuscating this network as illustrated in FIG. 4 and by repeating it for all output nibbles of the first round. The other rounds except for the last round may be kept the same as depicted in FIG. 3, where besides an output encoding the Q-tables now also have an input encoding. In a like manner, the split S-boxes may be used in last round in the same manner as for the first round. In other embodiment split S-boxes may be used in all rounds of the cryptographic function.

The tables $Q_{i,j,l}$ in FIG. 3 are defined by $$Q_{i,j,l}=\otimes_{\alpha_{l,i}} \circ S \circ \oplus_{k_{i,j}},$$

where $\otimes_x$ denotes multiplication with x in $GF(2^8)$. In this embodiment the S-box S is split into two arbitrary functions $S_1$ and $S_2$ with $S(x)=S_1(x) \oplus S_2(X)$. Such split S-boxes $S_1$ and $S_2$ may be found by choosing $S_1$ at random (there are $256^{256}$ possibilities for this), and defining $S_2(x)=S_1(x) \oplus S$ (x). Merging these functions $S_1$ and $S_2$ with the key-addition and the MixColumns, for the tables $Q_{i,j,l}$ above results in tables $$O_{i,j,l} = \otimes_{\alpha_{l,i}} \circ S_1 \circ \oplus_{k_{i,j}}$$

and $$P_{i,j,l} = \otimes_{\alpha_{l,i}} \circ S_2 \circ \oplus_{k_{i,j}}.$$

This results in $$Q_{i,j,l}(x) = O_{i,j,l}(x) \oplus P_{i,j,l}(x).$$

Figure 5:
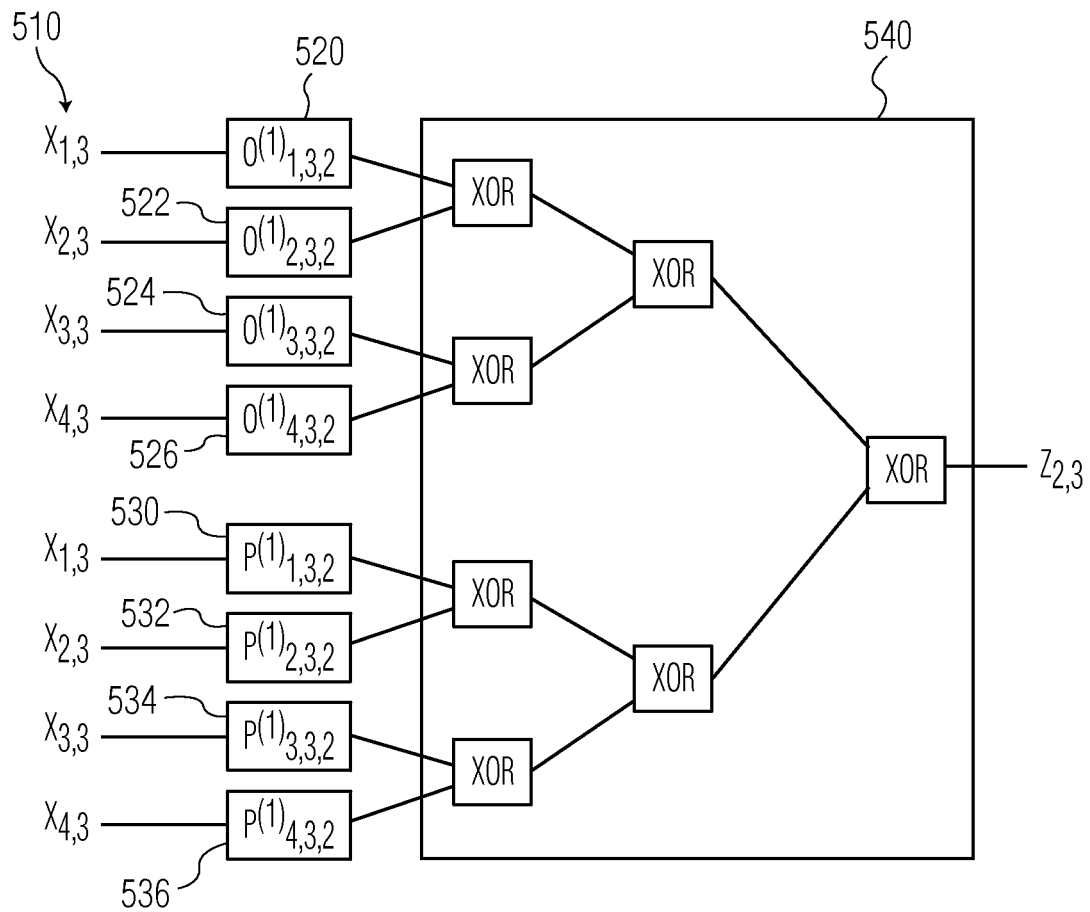
FIG. 5 illustrates the computation of one output nibble by means of a network of look-up tables according to an embodiment with two split S-boxes.

FIG. 5 illustrates the computation of one output nibble by means of a network of look-up tables according to an embodiment with two split S-boxes. From the equation for $Q_{i,j,l}$ above, it follows that the table network of FIG. 5 computes the same value as the table network depicted in FIG. 3. The superscript index (1) in the O-boxes and P-boxes indicates that the tables only provide the first nibble of the output of the O-box and P-box. A set of input bytes $x_{1,3}$, $x_{2,3}$, $x_{3,3}$, and $x_{4,3}$ in the input state 510 are input into the O-boxes 520, 522, 524, 526. The set of input bytes $x_{1,3}$, $x_{2,3}$, $x_{3,3}$, and $x_{4,3}$ in the input state 510 are also input into the P-boxes 530, 532, 534, 536. The outputs of O-boxes 520, 522, 524, 526 and P-boxes 530, 532, 534, 536 are input into the XOR network 540. The XOR network 540 combines its inputs into the first nibble of the output $z_{2,3}$ of output state. The second nibble of the output $z_{2,3}$ of output state may be calculated in the same way using additional O-boxes and P-boxes along with a similar XOR network. Further, additional sets of tables may be implemented to completely convert the input state 510 into the output state by receiving a column of bytes from the input state and converting them into the output of the corresponding column of the output state. It should be noted that the outputs of the O-boxes and P-boxes are combined in such a way that the outputs are mixed. This mixing ensures that the outputs of the O-box and the P-box for a single input byte, for example, $x_{1,3}$, are not directly combined. If that were done, then attacker would have an input and output of the system that would be the same as without any splitting of the S-boxes. As can be seen in the XOR network 540, the outputs split S-boxes for different input bytes are combined first, thus ensuring that the outputs of the S-boxes for a single input byte are never combined by themselves.

Further, while the same set of split S-boxes is shown as being applied to each input byte, it is possible to select a different set of split S-boxes for each input byte.

A method according to the embodiments of the invention may be implemented on a computer as a computer implemented method, or in dedicated hardware, or in a combination of both. Executable code for a method according to the invention may be stored on a computer program medium. Examples of computer program media include memory devices, optical storage devices, integrated circuits, servers, online software, etc.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner. For example, the automated method to create the cryptographic system would generate the split S-boxes in a way unknown to an attacker.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

Any combination of specific software running on a processor to implement the embodiments of the invention, constitute a specific dedicated machine.

A hardware system implementation of the embodiments of the invention may include hardware elements implementing the basic blocks of the white-box implementation. These hardware elements may include, for example, lookup tables or finite state machines. These hardware elements may be interconnected to fully carry out the white-box implementation.

As used herein, the term "non-transitory machine-readable storage medium" will be understood to exclude a transitory propagation signal but to include all forms of volatile and non-volatile memory.

As used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of performing a white-box keyed cryptographic operation mapping an input message to an output message, wherein the cryptographic operation implementation is a white-box cryptography implementation, wherein the input message comprises m input data and the output message comprises m output data and wherein the cryptographic operation includes at least one round and the cryptographic operation specifies a substitution box for mapping input data into output data, comprising:

transforming each of the m input data into n output data using n split substitution boxes, wherein the n split substitution boxes sum to the specified substitution box and wherein the output data of the n split substitution boxes is secretly encoded and the encoding is different for each of the n split substitution boxes, wherein the secret encoding is integrated into the n split substitution boxes and the secret encoding hides the output value of the n split substitution boxes from an attacker; and mixing and combining the m×n encoded output data.

2. The method of claim 1, further comprising m sets of n split substitution boxes, wherein all of the sets of n split substitution boxes applied to each of the plurality of input data are different from one another and the n split substitution boxes sum to the specified substitution box.

3. The method of claim 1, further comprising m sets of n split substitution boxes, wherein at least two of the sets of n split substitution boxes applied to each of the plurality of input data are different from one another and the n split substitution boxes sum to the specified substitution box.

4. The method of claim 1, wherein mixing and combining the m×n encoded output data includes at least one of the n outputs of each of the m sets of outputs is combined with at least one output of another set n outputs before the at least one of the n outputs is combined with the remaining n−1 outputs of its set of outputs.

5. The method of claim 1, wherein the input data is unencoded data input into a first round of the keyed cryptographic operation.

6. The method of claim 1, wherein the combined output data is used to calculate a portion of the output message, wherein the output message is an unencoded output of the last round of the keyed cryptographic operation.

7. The method of claim 1, wherein the cryptographic operation is the Advanced Encryption Standard.

8. The method of claim 1, wherein the cryptographic operation is the Data Encryption Standard.

9. The method of claim 1, wherein transforming an input data into n output data using n split substitution boxes is implemented using a n lookup tables corresponding to the n split substitution boxes, wherein the n lookup tables combine the n split substitution boxes with a cryptographic key.

10. The method of claim 1, wherein transforming an input data into n output data using n split substitution boxes is implemented using a n finite state machines corresponding to the n split substitution boxes, wherein the n finite state machines combine the n split substitution boxes with a cryptographic key.

11. A non-transitory machine-readable storage medium encoded with instructions for execution by a white-box system, wherein the white-box system performs a keyed cryptographic operation mapping an input message to an output message, wherein the input message comprises m input data and the output message comprises m output data and wherein the cryptographic operation includes at least one round and the cryptographic operation specifies a substitution box for mapping input data into output data, the non-transitory machine-readable storage medium, comprising:
    instructions for transforming each of the m input data into n output data using n split substitution boxes, wherein the n split substitution boxes sum to the specified substitution box and wherein the output data of the n split substitution boxes is secretly encoded and the encoding is different for each of the n split substitution boxes, wherein the secret encoding is integrated into the n split substitution boxes and the secret encoding hides the output value of the n split substitution boxes from an attacker; and
    instructions for mixing and combining the m×n encoded output data.

12. The non-transitory machine-readable storage medium of claim 11, further comprising m sets of n split substitution boxes, wherein all of the sets of n split substitution boxes applied to each of the plurality of input data are different from one another and the n split substitution boxes sum to the specified substitution box.

13. The non-transitory machine-readable storage medium of claim 11, further comprising m sets of n split substitution boxes, wherein at least two of the sets of n split substitution boxes applied to each of the plurality of input data are different from one another and the n split substitution boxes sum to the specified substitution box.

14. The non-transitory machine-readable storage medium of claim 11, wherein instructions for mixing and combining the m×n encoded output data includes at least one of the n outputs of each of the m sets of outputs is combined with at least one output of another set n outputs before the at least one of the n outputs is combined with the remaining n−1 outputs of its set of outputs.

15. The non-transitory machine-readable storage medium of claim 11, wherein the input data is unencoded data input into a first round of the keyed cryptographic operation.

16. The non-transitory machine-readable storage medium of claim 11, wherein the combined output data is used to calculate a portion of the output message, wherein the output message is an unencoded output of the last round of the keyed cryptographic operation.

17. The non-transitory machine-readable storage medium of claim 11, wherein the cryptographic operation is the Advanced Encryption Standard.

18. The non-transitory machine-readable storage medium of claim 11, wherein the cryptographic operation is the Data Encryption Standard.

19. The non-transitory machine-readable storage medium of claim 11, wherein instructions for transforming an input data into n output data using n split substitution boxes is implemented using a n lookup tables corresponding to the n split substitution boxes, wherein the n lookup tables combine the n split substitution boxes with a cryptographic key.

20. The non-transitory machine-readable storage medium of claim 11, wherein instructions for transforming an input data into n output data using n split substitution boxes is implemented using a n finite state machines corresponding to the n split substitution boxes, wherein the n finite state machines combine the n split substitution boxes with a cryptographic key.

21. A method of producing a white-box implementation of a cryptographic operation mapping an input message to an output message in a white-box system, wherein the input message comprises m input data and the output message comprises m output data and wherein the cryptographic operation includes at least one round and the cryptographic operation specifies a substitution box for mapping input data into output data, comprising:
    producing a white-box implementation of the keyed cryptographic operation further comprising:
    producing n split substitution boxes, wherein the n split substitution boxes sum to the specified substitution box and wherein the output data of the n split substitution boxes is secretly encoded and the encoding is different for each of the n split substitution boxes, wherein the secret encoding is integrated into the n split substitution boxes and the secret encoding hides the output value of the n split substitution boxes from an attacker; and
    implementing the mixing and the combining of the m×n encoded output data in the white-box system.

22. The method of claim 21, wherein the split substitution boxes further comprises m sets of n split substitution boxes, wherein all of the sets of n split substitution boxes applied to each of the plurality of input data are different from one another and the n split substitution boxes sum to the specified substitution box.

23. The method of claim 21, wherein the split substitution boxes further comprises m sets of n split substitution boxes, wherein at least two of the sets of n split substitution boxes applied to each of the plurality of input data are different from one another and the n split substitution boxes sum to the specified substitution box.

24. The method of claim 21, wherein mixing and combining the m×n encoded output data includes at least one of the n outputs of each of the m sets of outputs is combined with at least one output of another set n outputs before the at least one of the n outputs is combined with the remaining n−1 outputs of its set of outputs.

25. The method of claim 21, wherein the input data is unencoded data input into a first round of the keyed cryptographic operation.

26. The method of claim 21, wherein the combined output data is used to calculate a portion of the output message, wherein the output message is an unencoded output of the last round of the keyed cryptographic operation.

27. The method of claim 21, wherein the cryptographic operation is the Advanced Encryption Standard.

28. The method of claim 21, wherein the cryptographic operation is the Data Encryption Standard.

29. The method of claim 21, wherein the n split substitution boxes are implemented using n lookup tables corresponding to the n split substitution boxes, wherein the n lookup tables combine the n split substitution boxes with a cryptographic key.

30. The method of claim 21, wherein the n split substitution boxes are implemented using n finite state machines corresponding to the n split substitution boxes, wherein the n finite state machines combine the n split substitution boxes with a cryptographic key.

* * * * *